June 2, 1925.
W. A. PARTIE
1,539,862
BRAKE ATTACHMENT FOR MOTOR VEHICLES
Filed Nov. 5, 1924
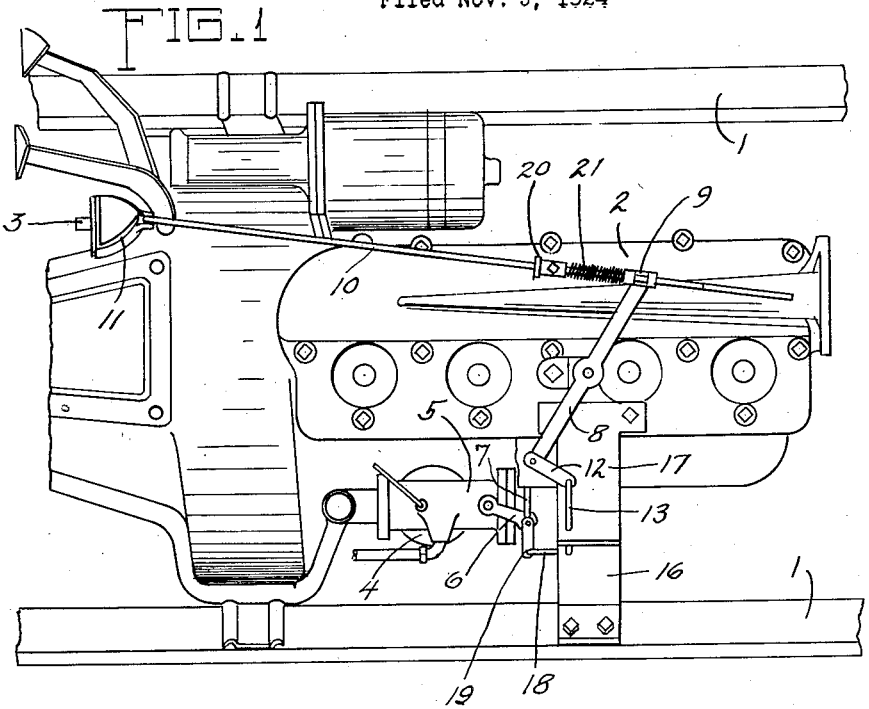
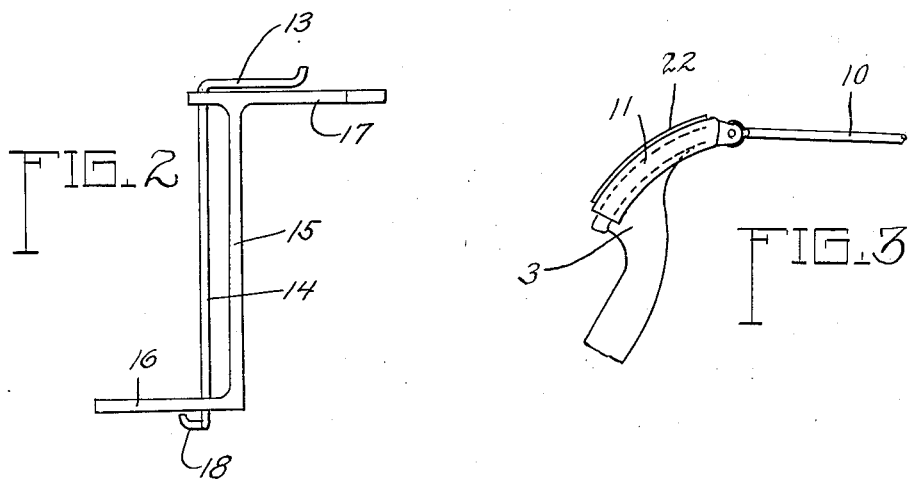
INVENTOR.
William A. Partie.
BY Walter N. Haskell,
his ATTORNEY.

Patented June 2, 1925.

UNITED STATES PATENT OFFICE.

WILLIAM A. PARTIE, OF MOLINE, ILLINOIS.

BRAKE ATTACHMENT FOR MOTOR VEHICLES.

Application filed November 5, 1924. Serial No. 747,904.

*To all whom it may concern:*

Be it known that I, WILLIAM A. PARTIE, a citizen of the United States, residing at Moline, in the county of Rock Island and State of Illinois, have invented certain new and useful Improvements in a Brake Attachment for Motor Vehicles, of which the following is a specification.

My invention has reference to a brake attachment for motor vehicles, and has for its purpose to provide a means for automatically operating the throttle valve in the feed intake pipe of the motor, coincidently with the action of the brake lever in reducing the speed of the car. In the operation of a motor vehicle, it is usual to accompany the application of the brake with a shifting of the hand control of the throttle, so as to partially or wholly interrupt the supply of fuel to the engine. It is sometimes inconvenient or difficult to do this at the same time as the brake is set, or the operation of the valve is overlooked, so that the engine continues in operation, and the power thereof is directed against the restraining force of the brake. By the use of the present invention it is impossible for this to happen.

In the drawings:

Fig. 1 is a plan view of a motor and appurtenant parts, with the invention adapted thereto.

Fig. 2 is a detached view of the bracket 15, in side elevation.

Fig. 3 is a detail of the brake pedal, and connection therefor.

A fragmentary part of a motor vehicle frame is indicated by the reference number 1, upon which frame is mounted a motor 2. 3 represents the brake pedal, mounted in rear of the motor in the usual manner, and at the opposite side of the engine is the carburetor 4 and fuel intake pipe 5, within which is the usual throttle valve, (not shown in the drawings) under the control of a lever 6 which is connected by a rod 7 with the throttle rod to be found on the steering column of motor vehicles, and which is actuated by the hand of the operator. By this means the supply of fuel gas to the engine can be controlled.

Fulcrumed on the upper side of the motor, as at *a*, is a lever 8, at one end of which is a sleeve 9, slidable on a rod 10, which has a hinged connection with a shoe 11, clamped to the tread of the pedal 3. The other end of the lever 8 is connected by a link 12 with an arm 13 on the upper end of a vertical rod 14, supported by a bracket 15, provided at its lower end with a plate 16, secured to the frame 1, and at its upper end with a plate 17, attached to the engine casing. The rod 14 is pivotally held in the plates 16 and 17, and is provided at its lower end with an arm 18, connected by a link 19 with the lever 6.

A sleeve 20 is attached to the rod 10 by means of a set-screw, and between said sleeve and the sleeve 9 is supported on said rod an extensile coiled spring 21. When the pedal 3 is operated to set the brake the rod 10 is moved forward, first compressing the spring 21, and then causing a movement of the lever 8, as shown in Fig. 1 of the drawings. The movement of the lever 8 is imparted through the rod 14 to the lever 6, causing a movement thereof in a direction tending to close the valve which is controlled thereby, in the pipe 5. The rod 7 and lever control at the opposite end thereof, follows the movement of the lever 6. By this means the action of the brake pedal is accompanied by a shutting off of the fuel supply, without any special attention thereto by the operator.

When the pedal 3 is returned to its normal position, the sleeve 9 is free to move upon the end of the rod 10, in either direction, so that if the lever 6 is actuated by the manually controlled mechanism, through the medium of the rod 7, the lever 8 and intermediate parts will respond readily to such movement. Assuming the throttle valve to be closed or partially closed at the time when the brake is released, the next move will be to open such valve by means of the throttle lever on the steering post, and this movement returns the lever 8 to a position ready to be actuated by the next movement of the brake pedal.

The spring 21 prevents any sudden jar or shock to the parts upon the brake pedal being operated, and the tension of the spring can be regulated by adjustment of the position of the sleeve 20 upon the rod 10.

If desired, the casing 11 may be fitted with a pad 22 of rubber or similar material, to prevent the foot from slipping therefrom.

It will be understood that the showing of the invention in the drawings herein is for the purpose of illustration, and that the same can be changed in construction and arrangement of parts, so as to adapt it to other types of motors, without departing from the spirit of the invention, as set forth and claimed herein.

What I claim, and desire to secure by Letters Patent, is:

1. In combination with the motor of an automobile, and brake pedal in proximity thereto, a rod hingedly attached to said brake pedal; a lever supported transversely of said motor and provided on one of its ends with a sleeve slidable on said rod; a contact member fixed on said rod, adapted for engagement with said sleeve; and means of connection between the opposite end of said lever and the throttle valve of the motor, so as to actuate said valve coincidently with the movement of said brake pedal.

2. In combination with the motor of an automobile, and brake pedal in proximity therewith, a rod hingedly connected with the brake pedal; a lever fulcrumed above said motor, so as to extend transversely thereof, and provided at one of its ends with a sleeve slidable on said rod; a collar adjustably connected with said rod, and capable of imparting movement to said lever upon said brake pedal being actuated; a shock absorbing element between said collar and said sleeve; and means of connection between the opposite end of said lever and the throttle valve of the motor.

In testimony whereof I affix my signature.

WILLIAM A. PARTIE.